(12) United States Patent
Beeson et al.

(10) Patent No.: US 8,969,762 B2
(45) Date of Patent: Mar. 3, 2015

(54) WELDER WITH INTELLIGENT BATTERY CHARGER

(75) Inventors: Rick Beeson, Appleton, WI (US); Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1939 days.

(21) Appl. No.: 11/825,597

(22) Filed: Jul. 6, 2007

(65) Prior Publication Data

US 2009/0008368 A1    Jan. 8, 2009

(51) Int. Cl.
*B23K 9/10*      (2006.01)
*H02J 7/04*      (2006.01)

(52) U.S. Cl.
CPC ............... *B23K 9/1062* (2013.01); *H02J 7/045* (2013.01); *B23K 9/1006* (2013.01)
USPC .................................. 219/130.1; 219/137 PS

(58) Field of Classification Search
USPC ............... 219/121.39, 130.1, 130.21, 130.32, 219/130.33, 130.4, 130.5, 133; 320/137, 320/149
See application file for complete search history.

(56) References Cited

U.S. PATENT DOCUMENTS

| | | | |
|---|---|---|---|
| 6,469,401 B2 | 10/2002 | Beeson et al. | |
| 6,674,179 B2 | 1/2004 | Beeson et al. | |
| 6,818,860 B1* | 11/2004 | Stava et al. | ............ 219/130.1 |
| 6,822,425 B2* | 11/2004 | Krieger et al. | ............ 320/139 |
| 7,211,764 B2 | 5/2007 | Leisner et al. | |
| 2002/0101218 A1* | 8/2002 | Koenck et al. | ............ 320/140 |
| 2005/0109748 A1* | 5/2005 | Albrecht et al. | ............ 219/130.1 |
| 2006/0215389 A1 | 9/2006 | Fosbinder et al. | |
| 2007/0278993 A1 | 12/2007 | Vogel | |

* cited by examiner

*Primary Examiner* — Brian Jennison
(74) *Attorney, Agent, or Firm* — Fletcher Yoder P.C.

(57) ABSTRACT

A system, in one embodiment, may include a portable welder having a welding output, a charging output, a welding circuit coupled to the welding output; and a charging circuit coupled to the charging output. The charging circuit may be configured to automatically adjust power to the charging output based on a feedback associated with charging a battery.

22 Claims, 5 Drawing Sheets

WELDER WITH INTELLIGENT BATTERY CHARGER

BACKGROUND

The invention relates generally to welding systems and more particularly to portable welding systems including a charging output.

Welding and cutting systems generally include a power supply configured to supply a current used in the operation of the respective system. In these systems, the current may be passed through, near, or around a work piece to weld or cut the work piece. Typically, the power supply receives alternating current (AC) power from a power grid and conditions the power for use in the specific system. Portable welding units generally include compact configurations that are maneuverable and can be plugged into various external AC power sources, such as an AC power grid, or an AC generator. The compact configuration of portable welding units enables an operator to easily transport the unit for welding and cutting in various locations.

Welding units are generally configured to output power specifically for welding or cutting rather than other applications. Typically, other power supplies, such as battery chargers, are standalone units. In addition, welding units lack the intelligence to supply power correctly and safely to other applications, such as batteries.

BRIEF DESCRIPTION

A system, in one embodiment, may include a portable welder having a welding output, a charging output, a welding circuit coupled to the welding output; and a charging circuit coupled to the charging output. The charging circuit may be configured to automatically adjust power to the charging output based on a feedback associated with charging a battery.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
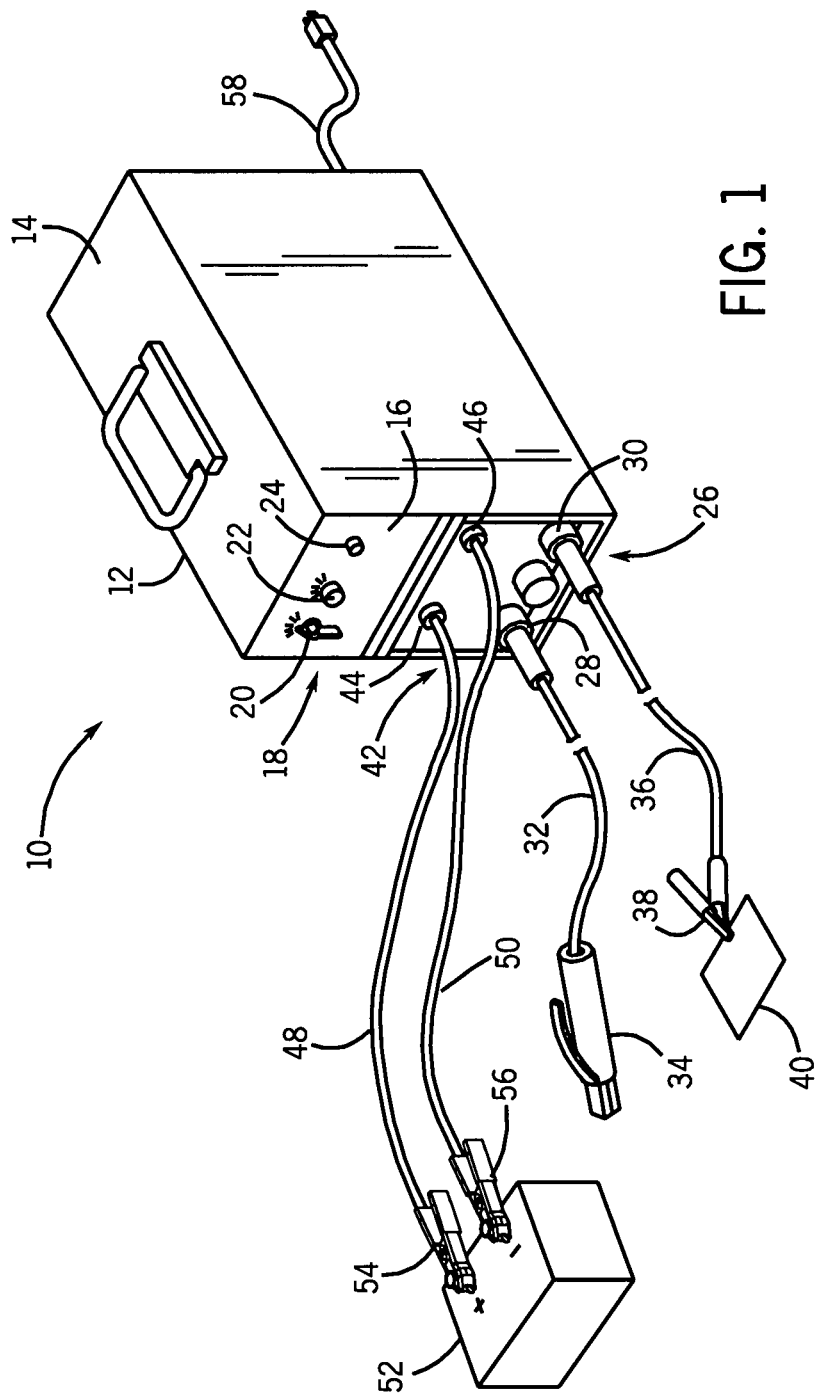
FIG. 1 is a perspective view of an exemplary portable welding/charging system in accordance with embodiments of the present invention.

Referring now to the drawings, FIG. 1 illustrates an intelligent or smart welding/charging system 10 in accordance with one embodiment of the present technique. In other words, the system 10 does not blindly provide an output power for welding and/or charging, but rather the system 10 analyzes various parameters, executes various logic, and intakes sensed feedback to make an intelligent decision regarding the output. As discussed in detail below, the welding/charging system 10 includes a power supply with outputs for welding and charging. The charging outputs may also be used to jump start an engine driven device, such as an automobile. In certain embodiments, the welding and charging outputs are separate from one another. Further, the power supply includes control circuitry that provides a welding output and a charging output based on the selected configuration. For example, a user can select the voltage of the battery or device to be charged, or jump started, and the power supply 12 automatically adjusts the charging output accordingly. In certain embodiments, the control circuitry of the power supply includes a microprocessor implementing a charge, or jump start routine to optimize the output to the battery and to prevent damaging the battery. Accordingly, the welding/charging system 10 provides a portable welder with a welding output and a "smart" charge/jump output.

As depicted in the FIG. 1, the portable welding/charging system 10 includes a power supply 12. The power supply 12 is housed in an enclosure 14 that provides for the assembly and protection of various components. The power supply 12 includes a control panel 16 that is accessible by a user. The control panel 16 includes various inputs and outputs that enable a user to select various processes and receive feedback from the power supply 12. For example, the control panel 16 includes external controls/indicators 18 that include a mode selection dial 20, a voltage selection dial 22, and a battery status light emitting diode (LED's) 24. The control panel 16 may include any variety of controls and indicators, such as buttons, switches, liquid crystal displays (LCD's), and the like to provide for user interaction with the power supply 12.

A welding output 26 is also located on the power supply 12. The welding output 26 includes a first weld connector 28 and a second weld connector 30. In one embodiment, the first weld connector 28 is coupled to a supply cable 32 that is connected to a welding torch/gun 34. The supply cable 32 provides a path for current to be delivered to the welding torch/gun 34, as well as a supply path for a consumable electrode, and a shielding gas to be delivered to the location of the weld. The second weld connector 30 is coupled to a work cable 36 that includes a work clamp 38 configured to couple the work cable to a workpiece 40. When the system 10 is configured for welding, the power supply 12 may provide a direct current electrode positive (DCEP) current that flows from the first weld connector 28, through the supply cable 32, from the welding torch/gun 34, to the work piece 40 via a welding arc, and returns to the second weld connector 30 via the work clamp 38 and the work cable 36. Similarly, the power supply 12 may provide a direct current electrode negative (DCEN) current that flows in the opposite direction, e.g., current provided from the second weld connector 30 and returning via the first weld connector 28. The power supply 12 may provide various forms of power required for welding techniques via the welding outputs 26, including AC power.

The power supply 12 also has a battery charging output 42. The charging output 42 includes a first charge connector 44 and a second charge connector 46. In one embodiment, a first charge cable 48 is coupled to the first charge connector 44 and a second charge cable 50 is coupled to the second charge connector 46. As depicted, each of the charge cables 48 and 50 are connected to a battery 52 via terminal clamps 54 and 56. When the system 10 is configured for charging, the power supply 12 may provide a charging voltage and current across the charging outputs 42 to charge the battery 52. When the system 10 is configured for jump starting, the power supply 12 may be configured to output a jump voltage and current across the charging outputs 42.

As is discussed in further detail below, the system 10 may be configured to charge and to jump-start various types of batteries 52. For instance, the power supply 12 may regulate the power to the charging outputs based on the voltage and type of the battery 52. For example, the battery 52 may include 6 volt (V), 12 V, 24 V, 36 V, 48 V, and the like batteries. Further, the battery 52 may include deep cycle batteries, low maintenance batteries, gel cell batteries, lithium ion batteries, nickel metal hydride batteries, nickel cadmium batteries, and the like. The batteries 52 may include batteries such as those used in general and industrial uses, automotive batteries, batteries used to run engine driven equipment, batteries used as a constant power source, marine batteries, and the like. As noted above, the system 10 may include intelligence to automatically sense feedback, make logical decisions, and adjust the output based on the battery type, condition, and so forth. Thus, the system 10 may automatically adjust the voltage and current levels depending on the voltage of the battery, the degree of charge in the battery, problems with battery, etc.

Embodiments of the system 10 may include various combinations of the welding outputs 26 and the charging outputs 42. For instance, as depicted, the weld outputs 26 and the charging outputs 42 each include a separate set of connectors. In this configuration, power can be completely removed from one set and provided to the other set. For instance, power can be removed from the welding outputs 26 and provided only to the charging outputs 42, or visa versa. Other embodiments may include a combination of connectors such that the welding outputs 26 and the charging outputs 42 each share a common connector. For example, the welding outputs 26 may include the first welding connector 28 and a common connector, and the charging outputs 42 may include the first charging connector 44 and the common connector. In such an embodiment, the common connector may provide a connection to the negative lead for each of the welding and charging welding functions. In another embodiment, a single set of connectors may be provided for both charging and welding. In yet another embodiment, multiple sets of welding and/or charging outputs may be provided such that multiple sets of cables can be connected simultaneously. In some embodiments, the system 10 may sense whether the cables are connected to a welding gun or a battery, and automatically adjust the output accordingly.

Figure 2:
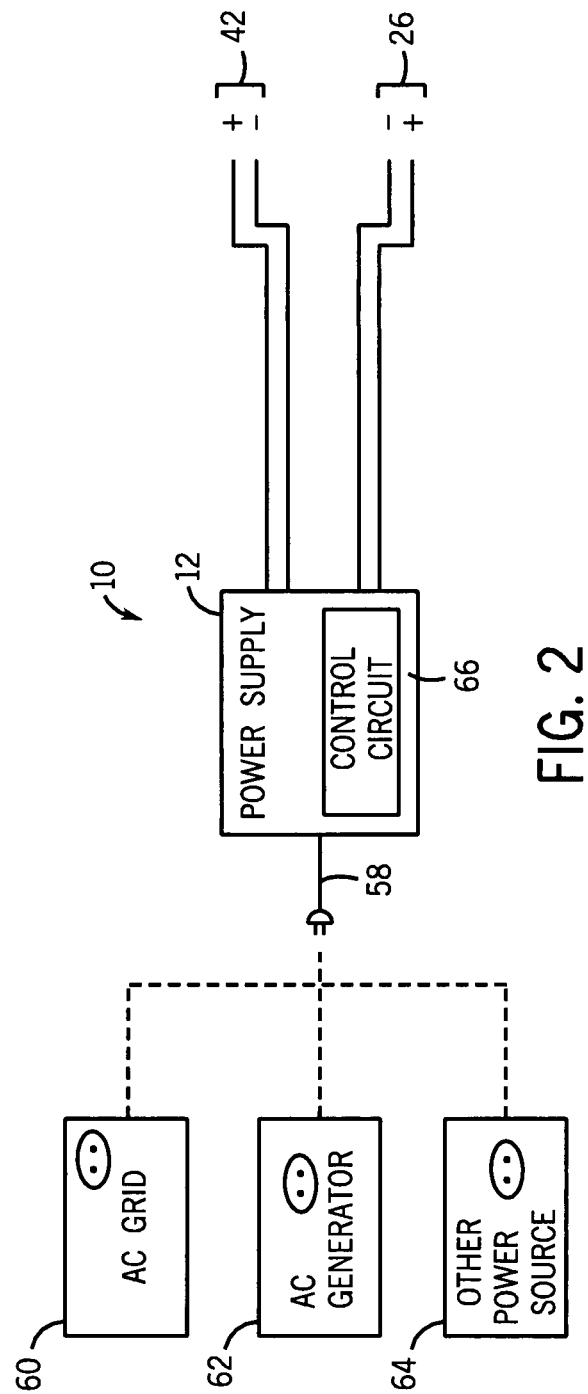
FIG. 2 is a diagram illustrating an exemplary embodiment of the portable welding/charging system illustrated in FIG. 1.

The system 10 also includes a power cable 58. The power cable 58 can be plugged into a power source to provide power to the power supply 12. Turning now to FIG. 2, an embodiment of the portable system 10 is illustrated. The system 10 and the power supply 12 may be coupled to various power sources via the power cable 58. Generally, the power source may include a source of AC power, such as an electrical AC power grid 60, or an AC generator 62. The AC power grid may include a 115 volts AC (VAC) or 230 VAC power utility grid. The AC generator 62 may include an engine driven generator, such as a gas or diesel power generator. Power may also be supplied from other power sources 64, such as a DC to AC inverter, and the like. In one embodiment, the other power source 64 may include a Miller Electric Autoline power device that provides a given power output, such as 120 VAC, 230 VAC, single phase power, three phase power, etc. Other embodiments may include various other devices capable of outputting the power required to operate the system 10.

FIG. 2 also illustrates an embodiment of the power supply 12 that includes a control circuit 66. As discussed previously, the power supply 12 may receive power from a power source and condition the power for welding or for charging. Accordingly, the power supply 12 may include the control circuit 66 to regulate the power output to the welding outputs 26 and/or the charging outputs 42. In one embodiment, the control circuit 66 may receive inputs, such as those provided by the controls on the front panel 16, and regulate the voltage and current output to the welding outputs 26 and the charging outputs 42. For example, the control circuit 66 may receive an input from the mode selection dial 20 that indicates operation in a welding mode, a charging mode, or a jump starting mode, and route power to the outputs 26 and 42 accordingly. Further, the control circuit 66 may receive additional inputs, such as a signal from the voltage selection dial 22 that indicates the voltage of the battery 52 to be charged. Accordingly, the control circuit 66 may further regulate outputs to the charging outputs 42 based on the signal from the voltage selection dial 22.

The control circuit 66 may include various configurations and logic to intelligently control the outputs of the system 10. For example, the control circuit 66 may include common circuitry configured to regulate power to the charging outputs 42 and the welding outputs 26. In another embodiment, the control circuit 66 may include multiple circuits configured to regulate the welding and charging outputs 26 and 42. For example, multiple circuits may operate independently or cooperatively to provide power to the welding outputs 26 and the charging outputs 42. Again, the one or more circuits 66 may monitor the outputs, loads, and various feedback to automatically adjust the output voltage and current levels for a particular welding gun or battery.

Figure 3:
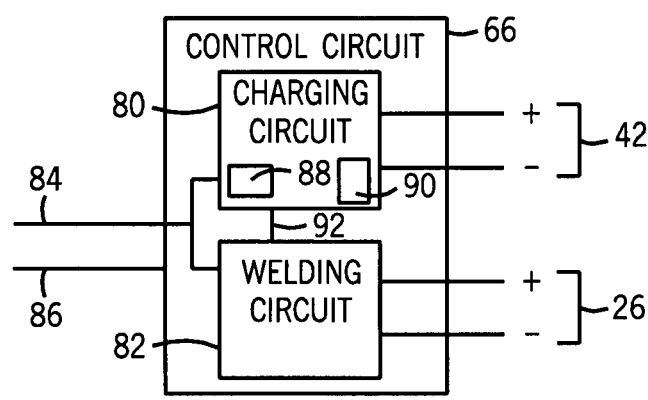
FIG. 3 is a diagram illustrating an exemplary embodiment of a control circuit of the portable welding/charging system illustrated in FIG. 2.

FIG. 3 illustrates an embodiment of the control circuit 66 that includes a charging circuit 80 and a welding circuit 82. As depicted, the charging circuit 80 and the welding circuit 82 are provided as two separate circuits that provide independent outputs. For example, in a charging configuration, the charging circuit 80 may receive AC power via an input 84 and output a charge voltage and current via the charging outputs 42. Similarly, when the system 10 is configured for welding, the welding circuit 82 may condition the AC power received at the input 84 to output a welding voltage and current on the welding outputs 26.

In an embodiment, other control signals, such as those from the control panel 16, are routed to a control input 86 to enable the control circuit 66 to provide increased control of the outputs. For example, the control signals may include signals from the mode selection dial 20, the voltage selection dial 22 and the like, such that the control circuit 66 may enable or disable the charging circuit 80 and/or the welding circuit 82. In other embodiments, the control signals may be provided to the welding circuit 82 and the charging circuit 80 so that each may configure their operation accordingly.

In addition to receiving control signals, the control circuit 66 may provide for feedback to the user. In one embodiment, the charging circuit 80 may indicate the status of the battery 52 or device being charged by providing a signal to light the battery status LED 24. For example, a red light may indicate an error, a yellow light may indicate charging, and a green light may indicate a full charge. Similarly, the welding circuit 82 may provide feedback to the user.

The charging circuit 80 may also include additional circuitry and components to provide for voltage and current outputs that are configured to optimize charging and jump-starting operations. As depicted in FIG. 3, the charging circuit 80 includes a microprocessor 88. The microprocessor enables the charging circuit 88 to process various charging routines that are configured to monitor and vary the voltage and current levels on the charging outputs 42. For instance, the charging circuit 88 may include a memory 90, such as a nonvolatile memory, that stores various charging routines for each specific type of battery 52. In other words, each routine may correspond to a particular set of selections made by the user, or automatically sensed data (e.g., battery type, charge level, etc.), or both. The microprocessor 88 may retrieve each routine from memory 90 and manage the charge output based on the routine. Although the depicted embodiment includes a microprocessor 88 and memory 90 located within the charging circuit 88, other embodiments may include the microprocessor 88 and/or the memory 90 within the control circuit 66 or other locations within the system 10.

The charging circuit 80 and the welding circuit 82, although depicted separately, may share various components and functions. For example, the illustrated embodiment includes a path 92 that couples the two circuits. In this configuration, each circuit may share information and signals to coordinate their operation. For example, as depicted, the control circuit 66 may include a single processor 88 that controls operation of the charging circuit 80 and controls operation of the welding circuit 82 via the path 92. In other words, coupling the two circuits 80 and 82 may enable the operation of each circuit to be synchronized by a single microprocessor 88. Accordingly, if one mode of operation is selected, the control circuit 66 may only output a voltage and current on one of the outputs, e.g., the welding outputs 26 or the charging outputs 42. Further, an embodiment may include multiple microprocessors 88 within the system 10 operating independently or in cooperation.

Figure 4:
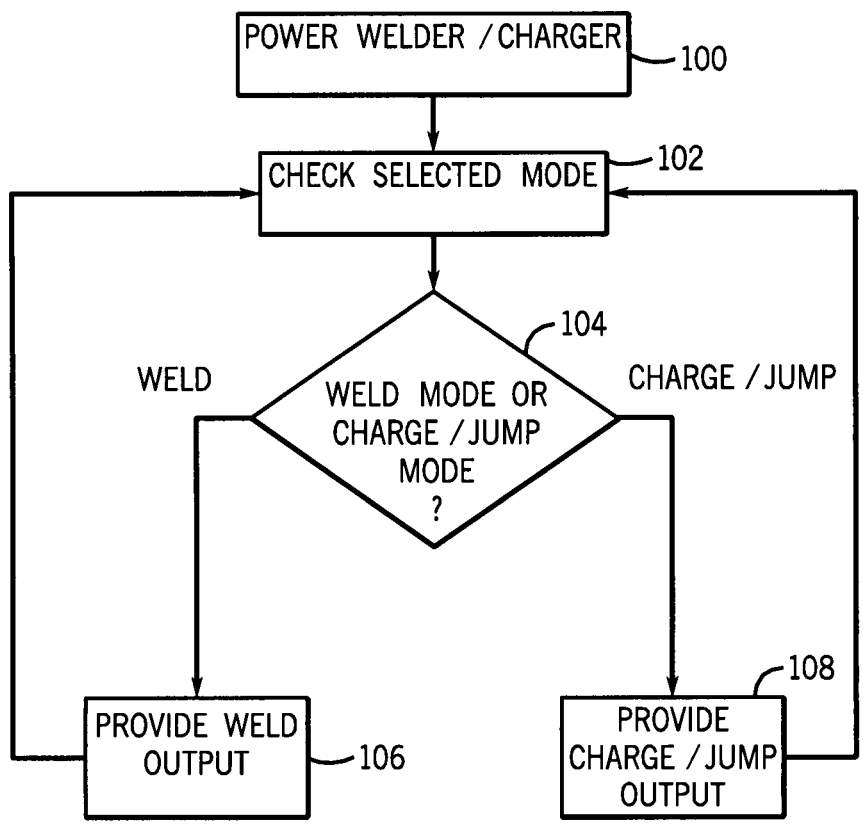
FIG. 4 is a flowchart illustrating an exemplary method of operating the portable welding/charging system illustrated in FIG. 1.

Turning now to FIG. 4, a flowchart illustrating general operation of an embodiment of the welding/charging system 10 is depicted. The welding charging system 10 is configured to provide either a welding output or a charging output based on the processes selected by a user. For example, operation of the system 10 includes powering the welder/charger, as depicted at block 100. Powering the welder/charger may include the user moving a switch or the mode selection dial 20 from an "off" to an "on" position to power up the system 10. The system 10 then checks the selected mode, as indicated at block 102. Checking the selected mode (block 102) may include the control circuit 66 receiving inputs from the control panel 16 that are configured to enable the control circuit 66 to determine which mode is selected. For instance, the mode selection dial 20 may be turned to a welding mode or a charge/jump mode. Based on the check at block 102, the system 10 determines whether the weld mode or charge/jump mode is selected, as depicted at block 104, and takes the appropriate action. In some embodiments, the system 10 may automatically detect a desired mode based on feedback, such as an on-demand trigger or switch on the welding gun 34, presence of a battery connected to the charging outputs 42, or the like.

In an embodiment where it is determined that a weld mode is selected, the system 10 provides a weld output, as depicted at block 106. Providing a weld output (block 106) may include the control circuit 66, and/or the welding circuit 82 outputting an appropriate power to the welding outputs 26. For example, a user may select a given weld process, such as metal inert gas (MIG), tungsten inert gas (TIG), shielded metal arc welding (SMAW), and the like, and the welding circuit 82 may control the current, voltage, and polarity of the power on the welding outputs 26 accordingly. Power to the weld outputs 26 may also be regulated by a user operated trigger that is engaged by the welder during a welding process. As indicated by the flowchart, the system 10 may operate in a loop to continuously monitor the status of the selected mode, and output the appropriate power.

In an embodiment where it is determined that a charge/jump mode is selected at block 104, the system 20 provides a charge/jump output, as depicted at block 108. Providing a charge/jump output (block 108) may include the control circuit 66 and/or the charging circuit 80 outputting power to the charging outputs 42. The output may include a 6 volt, 12 volt, 24 volt, 36 volt, 48 volt, and the like modes. For example, a user may select a given charge process for a battery type and battery voltage level, and the charging circuit 80 may control the voltage and current of power provided at the charging outputs 42. This may include the microprocessor 88 retrieving a charging routine from memory 90 and outputting power in accordance with an associated charging profile over a given period of time. Similarly, if a user selects a jump output, the charging circuit 66 may output an appropriate voltage and current level for the selected operation. In general, a jump voltage and current may include a significantly higher current level than a charging operation. Again, some embodiments of the system 10 may automatically control aspects and selection of the outputs 106 and 108 based on sensed feedback with or without direct user input.

Figure 5:
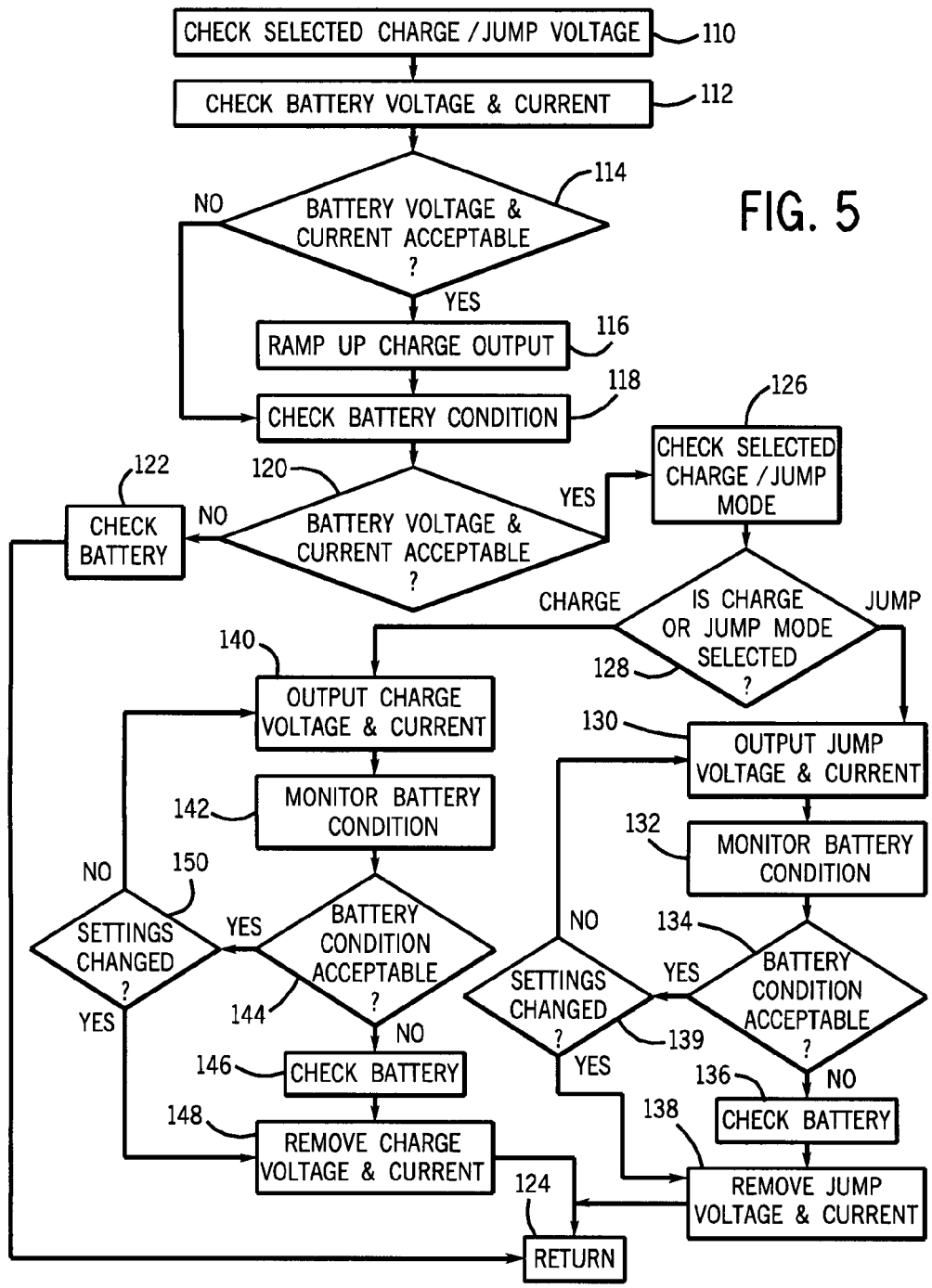
FIG. 5 is a flowchart illustrating an exemplary method of implementing a charge/jump routine within the method of operating the portable welding/charging system illustrated in FIG. 4.

FIG. 5 illustrates a detailed embodiment of the "provide charge/jump output" depicted at block 108 of FIG. 4. The embodiment of FIG. 5 includes a "smart" charge/jump routine that checks and monitors the status of the battery 52, or other connected device, and outputs an appropriate voltage and current, or indication to check the battery 52 or the device. Turning now to block 110, the system 10 may check the selected charge/jump voltage. For instance, as described previously, a user may indicate the voltage of the battery 52 or connected device by manipulating the voltage selection dial 22 or other input on the control panel 16. In one embodiment, the control circuit 66 and or the charging circuit 80 receives a signal from the inputs and determines the selected charge/jump voltage. Based on the selected voltage, the system 110 may then check the battery voltage and current, as depicted at block 112. For instance, the control circuit 66 and/or the charging circuit 80 may read the voltage across the charging outputs 42 and supplying a given current. The system 10 may then determine if the battery voltage and current is acceptable, as depicted at block 114. For instance, if the voltage measurement and current measurements are similar to the expected voltages based on a routine retrieved from the memory 90, the system 10 may continue to ramp up the charge output, as depicted at block 116. Ramping up the charge output (block 116) may include incrementally increasing the voltage output on the charge outputs 42 until the output voltage is approximately the same as a desired output level. For instance, the voltage may be ramped up to the selected charge/jump voltage determined at block 110. Once the charge output is ramped up to the desired value, the system 10 may then check the battery condition, as depicted at block 118. If it is determined at block 114 that the battery voltage and current level is not acceptable, the system 10 may skip the steps of ramping up the charge output (block 116), and proceed directly to checking the battery condition (block 118).

Checking the battery condition 118 may include the control circuit 66 or the charging circuit 80 monitoring the voltage and current levels. The system 10 may check if the voltage is too low and the current is too high, or if the voltage is acceptable and the current is too low, for instance. If the battery voltage and current is not acceptable (block 120), the system 10 may enable a check battery step at block 122 and return (block 124) to prior steps in the method, such as checking the selected mode at block 102 of FIG. 4.

The check battery 122 step may include alerting the user to the need to check the battery 52. For example, the control circuit 66 or the charging circuit 80 may generate a signal that lights the battery status LED 24 red to alert the user of an error. In response, the user may check the connections, be alerted to a bad battery 52, or take other steps to resolve the error. The check battery 122 step also may be supplemented with a battery reconditioning and or desulfate step, or other steps to potentially fix the battery. The system 10 also may provide error messages and/or codes to the user to assist with diagnosis.

If the battery voltage and current is acceptable, as determined at block 120, the system 10 may continue to execute the depicted charging routine. For example, if the battery has been checked and is considered acceptable, the system 10 may check whether a charge or jump mode is selected, as depicted at block 126. Checking the selected charge/jump mode (block 126) may include verifying a user selection, such as the position of the mode selection dial 20. Based on the check at block 126, the system 10 may then determine if a charge or jump mode is selected and proceed to a charge or jump routine, as depicted at block 128.

In the jump mode, the system 10 may execute a jump routine that applies an appropriate voltage and current to jump start a device while monitoring the condition of the battery 52 and checking for any changes in settings of the system 10. In one embodiment, the system 10 outputs a jump voltage and current, as depicted at block 130. In operation, system 10 may determine the voltage based on the check at block 110 and determine the current based on a jump routine stored in memory. For instance, in one embodiment, the microprocessor 88 receives the inputs for a jump mode at a given voltage, and retrieves a jump routine stored in the memory 90. Based on the routine, the microprocessor 88 configures the charging circuit 80 to output a given voltage and current. In general, the jump routine may include a high current output to deliver enough power to start a device. For jump starting, the amperage can vary over a large range depending on the desired amount of power to jump start. The current may include approximate ranges of 100 to 1000 amps, depending on the application. For instance, an embodiment may include outputting 600 amps at 12 volts. Other embodiments may include various amperage settings to provide a smaller boost during a jump start, such as approximately 50 amps. Accordingly, the system 10 may include one or multiple settings for the jump mode.

The jump routine may also include monitoring the battery condition, as depicted at block 132. Monitoring the battery condition (block 132) may include reading the voltage and current across the charging outputs 42. In one embodiment, the charging circuit 80 includes circuitry electrically coupled to the charging outputs 42 such that the charging circuit 80 can continuously monitor the output voltage and current. Feedback may also include the temperature of the battery 52. Based on the feedback, the system 10 may determine if the battery condition is acceptable, as depicted at block 134. If the condition is not acceptable, the system 10 may then proceed to a check battery step, as depicted at block 136. A discussed previously (block 122), the check battery step may include alerting the user to the need to check the battery 52. For example, the control circuit 66 or the charging circuit 80 may generate a signal that lights the battery status LED 24 red to alert the user of an error. In response, the user may check the connections, be alerted to a bad battery 52, or take other steps to resolve the error. Further, the system 10 may remove the jump voltage and current from the battery 52, as depicted at block 138 and return (block 124) to prior steps in the method, including checking the selected mode at block 102. Returning to the prior steps in the routine may enable the system 10 to verify the new settings and reconfigure the outputs based on the mode selected by the user.

If the battery condition is considered acceptable at block 134, the system 10 may proceed to check if settings have change, as depicted at block 139. For instance, the control circuit 66 may monitor the controls and indicators 18 of the control panel 16 to determine if a user has modified any of the settings. This signal may be forwarded to the charging circuit 80 and the microprocessor 88 such that system 10 may react to setting changes. For example, if no settings have changed, the system 10 may return to outputting the jump voltage and current, at block 130. However, if there has been a setting change, such as a change in the mode selection, the system 10 may then proceed to remove the jump voltage and current, as depicted at block 138, and return (block 124) to prior steps in the method, such as checking the selected mode at block 102.

Returning now to block 128, if it is determined that a charge mode is selected, the system 10 may proceed to output a charge voltage and current, as depicted at block 140. The charge output and voltage may include a simple constant voltage and current, or may include a complex charging profile to optimize the charging the battery 52. In one embodiment, a charge routine may include varying the current based on feedback received from the battery, such as current and/or temperature of the battery, the length of time of the charge, and the battery type. For example, a routine may include providing the battery 52 with a sequence of pulses at a given current and reducing the pulse length and current over the duration of the charge. By further example, a routine may include ramping up to an initial acceptable charge current and then gradually reducing the charge current as the battery becomes charged and accepts less current. Similar to the jump routine discussed previously, multiple charge routines may be stored in the memory 90 for various combinations of battery voltages and types. Based on the selected voltage (block 110) and battery type, a specific charge routine may be retrieved and executed by the microprocessor 88. The microprocessor 88 may control the specific voltage and current output to the charging outputs 42 based on the routine. For example, the charge routine may include a multi-phase charging routine. In one embodiment, the charging routine may include three phases that are implemented based on the condition of the battery. For instance, an initial current, such as 10 amps, may be delivered to the battery 52. As the battery 52 accepts the charge as indicated by feedback, the system 10 may progress into the second phase that includes outputting a 2 amp charging current, and eventually, the third phase that includes no current being delivered to the battery 52. In other words, the three phases may include reducing the current as the battery 52 begins to reach a fully charged state. Such a routine may prevent over charging the battery 52.

As depicted at block 142, the method may also include monitoring the battery condition. Similar to the routine discussed with regard to block 132, monitoring the battery condition may include reading the voltage and current across the charging outputs 42. In one embodiment, the charging circuit 80 includes circuitry electrically coupled to the charging outputs 42 such that the charging circuit 80 can continuously monitor the output voltage and current. Feedback may also include other parameters, including the temperature of the battery. Based on the feedback, the system 10 may determine if the battery condition is acceptable, as depicted at block 144. If the condition is not acceptable, the system 10 may proceed to a check battery step, as depicted at block 146. A discussed previously (block 122), the check battery step may include alerting the user to the need to check the battery 52. For example, the control circuit 66 or the charging circuit 80 may generate a signal that lights the battery status LED 24 red to alert the user of an error. In response, the user may check the connections, be alerted to a bad battery 52, or take other steps to resolve the error. Further, the system 10 may remove the charge voltage and current from the battery 52, as depicted at block 148 and return (block 124) to prior steps in the method, including checking the selected mode at block 102. Returning to the prior steps in the routine may enable the system 10 to verify the new settings and reconfigure the outputs based on the mode selected by the user.

If the battery condition is considered acceptable at block 144, the system 10 may then proceed to check if settings have changed, as depicted at block 150. For instance, the control circuit 66 may monitor the controls and indicators 18 of the control panel 16 to determine if a user has modified any of the settings. This signal may be forwarded to the charging circuit 80 and the microprocessor 88 such that system 10 may react to setting changes. For example, if no settings have changes, the system 10 may return to outputting the charge voltage and current, at block 140, i.e., outputting the voltage and current in accordance with the charging profile. However, if there has been a setting change, the system 10 may proceed to remove the charge voltage and current, as depicted at block 148, and return (block 124) to prior steps in the method, including checking the selected mode at block 102.

As will be appreciated, the method of operation is not limited to the sequence of steps depicted in FIGS. 4 and 5. For example, certain steps may be skipped or combined to provide operation in accordance with the present technique. For example, the check selected charge/jump mode at block 126 may be combined with checking the selected charge/jump voltage at block 110. Further, in other embodiments, the routine may include additional steps, such as prompting the user for a decision, e.g., to continue charging/jumping or to terminate the process. The method also may include a battery reconditioning step and/or desulfate step if the system 10 detects problems with the battery 52. The system 10 also may include an alternator voltage check, reverse polarity protections, short circuit protection, automatically variable rate charge logic, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a portable welder, comprising:
   a welding output;
   a charging output;
   a welding circuit coupled to the welding output;
   a charging circuit coupled to the charging output, wherein the charging circuit is configured to automatically adjust power to the charging output based on a feedback associated with charging a battery, wherein the charging circuit comprises a battery charge mode, a jump start mode, and a boost mode; and
   an automatic switch between the welding output and the charging output, wherein the automatic switch is configured to selectively activate the welding output in response to a first feedback indicative of welding demand, and the automatic switch is configured to selectively activate the charging output in response to a second feedback indicative of a charging demand.

2. The system of claim 1, wherein the welding output and the charging output share a single electrical connector pair of a positive connector and a negative connector.

3. The system of claim 1, wherein the charging circuit comprises a 6 volt mode, a 12 volt mode, a 24 volt mode, a 36 volt mode, and a 48 volt mode.

4. The system of claim 1, wherein the charging circuit is configured to charge deep cycle batteries, low maintenance batteries, gel cell batteries, lithium ion batteries, nickel metal hydride batteries, and nickel cadmium batteries.

5. The system of claim 1, wherein the feedback comprises a battery voltage reading, a battery current reading, and a battery temperature reading.

6. The system of claim 1, wherein the charging circuit is configured to provide an automatic regulation of power to the charging output during the course of charging the battery.

7. The system of claim 1, wherein the charging circuit comprises logic configured to provide for reconditioning or desulfating the battery.

8. A system, comprising:
   a welding unit configured to receive power from a source and output a power suitable for welding and output a power suitable for charging a battery, comprising:
   a control circuit comprising:
     a welding circuit configured to control welding power to a welding output;
     a smart charging circuit configured to control charging power to a charging output based on a feedback of a battery condition; and
     a microprocessor shared by the smart charging circuit and the welding circuit to control charging and welding operations.

9. The system of claim 8, wherein the smart charging circuit comprises battery check logic, battery reconditioning logic, and alternator check logic.

10. The system of claim 8, wherein the charging power output comprises a battery charge mode, a jump start mode, and a boost mode.

11. The system of claim 8, wherein the smart charging circuit comprises battery detection logic and battery type identification logic.

12. The system of claim 8, wherein the welding output and the charging output share a single electrical connector pair of a positive connector and a negative connector.

13. A method, comprising:
   controlling operations of a charging circuit and a welding circuit via a shared microprocessor;
   selectively outputting a charging power and a welding power from a welding/charging power unit, wherein selectively outputting comprises automatically switching to welding power in response to a first feedback indicative of welding demand, and selectively outputting comprises automatically switching to charging power in response to a second feedback indicative of a charging demand; and
   automatically adjusting the charging power based on a feedback relating to a battery to be charged.

14. The method of claim 13, wherein automatically adjusting comprises processing the feedback and executing logic on the shared microprocessor to make intelligent adjustments to the charging power.

15. The method of claim 13, wherein automatically adjusting comprises continuously regulating a current level of the charging power as the battery is progressively charged.

16. The method of claim 13, comprising outputting the charging power as a battery charge mode, a jump start mode, and a boost mode.

17. The system of claim 1, comprising a microprocessor shared by the charging circuit and the welding circuit, the first feedback is responsive to an on-demand trigger on a welding gun coupled to the welding output, and the second feedback is responsive to a presence of the battery coupled to the charging output.

18. The system of claim 1, comprising a microprocessor shared by the charging circuit and the welding circuit, wherein the microprocessor is configured to automatically control welding power to the welding output in response to the first feedback, the microprocessor is configured to automatically control charging power to the charging output in response to the second feedback, and the charging circuit comprises a battery charge mode, a jump start mode, a boost mode, and a battery recondition or desulfate mode.

19. The system of claim 1, wherein the welding output and the charging output share at least one common electrical connector.

20. The system of claim 8, comprising an automatic switch between the welding output and the charging output, wherein the automatic switch is configured to selectively activate the welding power to the welding output in response to a first feedback indicative of welding demand, and the automatic switch is configured to selectively activate the charging power to the charging output in response to a second feedback indicative of a charging demand.

21. The system of claim 20,
wherein the smart charging circuit comprises a battery charge mode, a jump start mode, a boost mode, and a battery recondition or desulfate mode;
wherein the smart charging circuit comprises battery detection logic and battery type identification logic; and
wherein the first feedback is responsive to an on-demand trigger on a welding gun coupled to the welding output, and the second feedback is responsive to a presence of the battery coupled to the charging output.

22. The system of claim 21, wherein the welding output and the charging output share at least one common electrical connector.

* * * * *